US011873968B2

(12) United States Patent
Amin

(10) Patent No.: US 11,873,968 B2
(45) Date of Patent: Jan. 16, 2024

(54) LIGHT FIXTURE WITH MULTIPLE OUTPUTS

(71) Applicant: HLI SOLUTIONS, INC., Greenville, SC (US)

(72) Inventor: Gaurav Amin, Simpsonville, SC (US)

(73) Assignee: HLI SOLUTIONS, INC., Greenville, SC (US)

( * ) Notice: Subject to any disclaimer, the term of this patent is extended or adjusted under 35 U.S.C. 154(b) by 0 days.

(21) Appl. No.: 17/544,269

(22) Filed: Dec. 7, 2021

(65) Prior Publication Data

US 2022/0178506 A1 Jun. 9, 2022

Related U.S. Application Data

(60) Provisional application No. 63/122,743, filed on Dec. 8, 2020.

(51) Int. Cl.

| | |
|---|---|
| ***F21S 8/02*** | (2006.01) |
| ***F21S 8/04*** | (2006.01) |
| ***F21S 4/28*** | (2016.01) |
| ***H05B 45/30*** | (2020.01) |
| ***F21S 2/00*** | (2016.01) |
| ***F21Y 115/10*** | (2016.01) |

(52) U.S. Cl.

CPC ............... *F21S 8/026* (2013.01); *F21S 2/005* (2013.01); *F21S 4/28* (2016.01); *F21S 8/043* (2013.01); *F21S 8/046* (2013.01); *H05B 45/30* (2020.01); *F21Y 2115/10* (2016.08)

(58) Field of Classification Search

CPC .. F21S 8/026; F21S 8/043; F21S 8/046; F21S 4/28; F21S 2/005; H05B 45/30

See application file for complete search history.

(56) References Cited

U.S. PATENT DOCUMENTS

| | | | | |
|---|---|---|---|---|
| 4,779,972 | A | 10/1988 | Gottlieb | |
| 2006/0049782 | A1 | 3/2006 | Vornsand et al. | |
| 2007/0297184 | A1 | 12/2007 | Isely | |
| 2011/0242809 | A1* | 10/2011 | Medendorp, Jr. | F21V 7/0016 362/235 |
| 2012/0087118 | A1 | 4/2012 | Bailey et al. | |

(Continued)

FOREIGN PATENT DOCUMENTS

| | | | | |
|---|---|---|---|---|
| CN | 101614328 A | * 12/2009 | | F21V 15/01 |
| WO | WO-2017184826 A1 | * 10/2017 | | F21S 8/033 |

OTHER PUBLICATIONS

PCT/US2021/062158—International Search Report and Written Opinion dated Feb. 25, 2022 (16 pages).

*Primary Examiner* — Anabel Ton

(74) *Attorney, Agent, or Firm* — Buckley, Maschoff & Talwalkar LLC

(57) ABSTRACT

A light fixture includes a housing having an upper wall, a first side wall, and a second side wall at least partially defining an interior and a bottom opening. A mounting tray is positioned in the interior and releasably connected to the housing. A first light emitter is connected to the mounting tray and has a first light output. A second light emitter is connected to the mounting tray and has a second light output. A third light emitter is connected to the mounting tray and has a third light output. A lens is connected to the housing. The light fixture can be optionally connected to a secondary light fixture and used to control light outputs from both fixtures.

18 Claims, 7 Drawing Sheets

(56) References Cited

U.S. PATENT DOCUMENTS

| | | | | |
|---|---|---|---|---|
| 2014/0268692 | A1* | 9/2014 | Edmond | F21S 8/026<br>362/225 |
| 2014/0268720 | A1* | 9/2014 | Dungan | F21S 2/005<br>362/218 |
| 2017/0307180 | A1* | 10/2017 | Veltri | F21V 15/01 |
| 2019/0082523 | A1 | 3/2019 | Yadav et al. | |
| 2019/0285253 | A1 | 9/2019 | Amin | |
| 2020/0340637 | A1* | 10/2020 | Yeo | F21V 23/04 |

* cited by examiner

LIGHT FIXTURE WITH MULTIPLE OUTPUTS

RELATED APPLICATION(S)

This application is based on U.S. Provisional Application Ser. No. 63/122,743, filed Dec. 8, 2020, the disclosure of which is incorporated herein by reference in its entirety and to which priority is claimed.

FIELD

Various exemplary embodiments relate to light fixtures having multiple light outputs.

BACKGROUND

Light fixtures, or luminaires, are used with electric light sources to provide aesthetic and functional housing in both interior and exterior applications. One type of light fixture is a recessed light. Recessed lighting fixtures provide lighting for a space, such as a building or room, and are aesthetically pleasing since the fixtures are advantageously recessed in a support such as a ceiling. For example, in healthcare applications, a patient or bed lighting fixture is often mounted to the wall above a patient's bed to provide a focused source of light for ambient and reading illumination for the patient. Such conventional lighting fixtures, however, are typically one-dimensional.

SUMMARY

According to certain configurations a light fixture includes multiple light outputs. The light outputs are configured to operated independently of one another to provide controlled lighting to a given area.

According to certain configurations, a lighting assembly includes a primary light fixture and a secondary light fixture. The secondary light fixture is operably connected to the primary light fixture.

According to certain configurations, a light fixture includes a housing having an upper wall, a first side wall, and a second side wall at least partially defining an interior and a bottom opening. A mounting tray is positioned in the interior and releasably connected to the housing. A first light emitter is connected to the mounting tray and has a first light output. A second light emitter is connected to the mounting tray and has a second light output. A third light emitter is connected to the mounting tray and has a third light output. A lens is connected to the housing.

According to certain configurations, a light fixture includes a primary housing having an upper wall, a first side wall, and a second side wall at least partially defining a primary interior and a bottom opening. A mounting tray is positioned in the primary interior and releasably connected to the primary housing. A first light emitter is connected to the mounting tray and has a first light output. A second light emitter is connected to the mounting tray and has a second light output. A third light emitter connected to the mounting tray and has a third light output. A primary lens is connected to the primary housing. A secondary housing defines a secondary interior. A secondary light emitter is positioned in the secondary interior. S secondary lens is connected to the secondary housing. A driver is positioned in the primary housing and provides power to at least one of the first, second, and third light emitters and provides power to the secondary light emitter.

Certain embodiments include a method of providing multiple light outputs. A primary lighting unit is positioned over an area. The primary lighting unit has a primary housing, a plurality of primary light emitters positioned in the primary housing, and a primary lens connected to the primary housing. A secondary lighting unit is positioned near the primary lighting unit over the area. The secondary lighting unit has a secondary housing, a plurality of secondary light emitters positioned in the secondary housing, and a secondary lens connected to the secondary housing. One or more drivers are connected to a power supply. The one or more drivers are connected to provide power to the primary light emitters and secondary light emitters. The one or more drivers are connected to a network, wherein the network provides a bridge between the one or more drivers and the user to control a light output of the primary light emitters and secondary light emitters.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
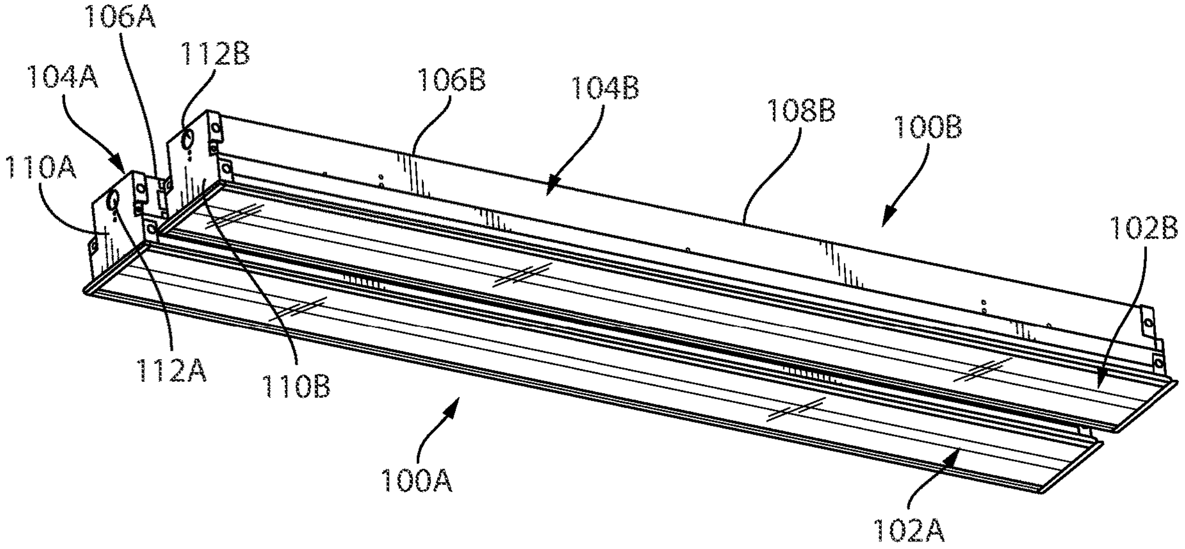
FIG. 1 is a bottom perspective view of an exemplary tandem light fixture.

Certain aspects are directed to light fixtures capable of emitting different light outputs. These light fixtures can include one or more lighting units used in combination with one another to provide flexible lighting solutions to a given area. One environment where this is useful is health care. For example, patient rooms can require multiple types of lighting. A brighter light (in intensity and color temperature) can be required for patient examinations while a dimmer light can be used for ambient lighting. A patient or doctor may also require a focused reading light that is aimed to a specific area of the room.

In some aspects, multiple lighting modes can be achieved by using one or more lighting units working together in a given area. For example, a primary lighting unit and a secondary lighting unit can be used. In certain embodiments, only a primary lighting unit can be used or more than one secondary lighting unit can be used. The range of brightness and the range of color of the light output for each lighting unit can be modified as needed for a given environment.

The lighting units can be recessed mounted in a ceiling and spaced apart to provide two light outputs that converge on a given area. Different mounting structure and trim can be used to incorporate the lighting units into different ceilings or wall types. In an example, the primary lighting unit can be positioned on one side of a patient bed and the secondary lighting unit can be positioned on the other side of the patient bed. The lighting units can each have an asymmetrical light output so that the light output from each fixture is directed to the patient bed.

The primary lighting unit can be operatively connected to the secondary lighting unit to control the secondary lighting unit output. This connection can be wired or wireless. The primary lighting unit contains one or more control components to control the light output of both lighting units. For example, the primary lighting unit can contain any combinations of drivers, sensors, and communication devices.

When the lighting units include LEDs, drivers can be used to convert an incoming power supply and condition the power for use with the LEDs. Drivers can also provide dimming control for the LEDs. One or more drivers can be positioned in the primary lighting unit and connected to the light emitters in both the primary and secondary lighting units. Certain embodiments can utilize AC driven LEDs that can eliminate the need for drivers. Other embodiments can utilize drivers incorporated into the PCBs that support the LEDs.

The primary lighting unit can also incorporate sensors and one or more communication devices to control the lighting units. The sensors can include occupancy sensors that adjust control of the light emitters based on the occupancy of the room. Other sensors can also be used, such as daylight sensors that adjust the light output based on the amount of ambient light in the room. One or more communication units can also be associated with the lighting unit. The communication unit can provide for wired or wireless communication and can be in communication with a remote system, for example a remote server, that provides operating instructions to the lighting unit. The lighting unit can also be in communication with other light fixtures, switches, or other components in the room. An example of control components and a control system is the HUBBELL NX which can provide fixture, room, and enterprise level control.

Figure 2:
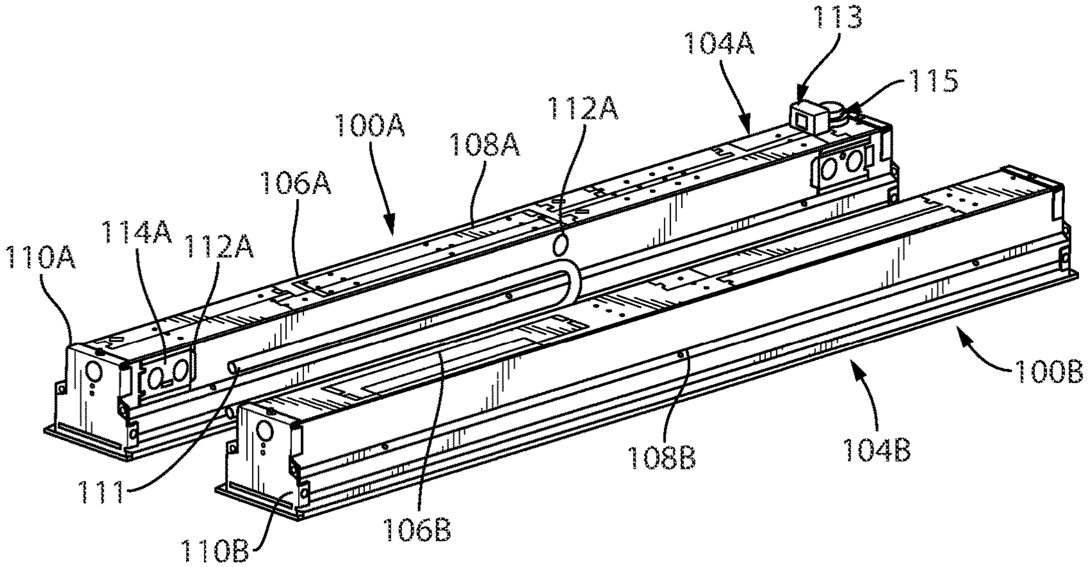
FIG. 2 is a top perspective view of FIG. 1.
Figure 3:
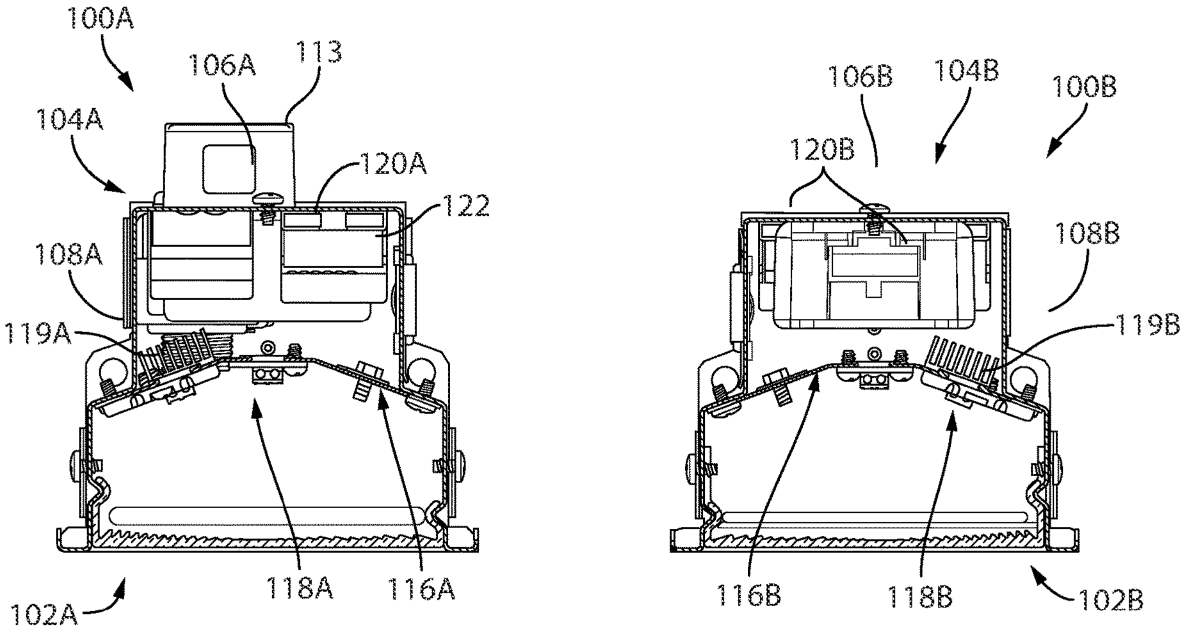
FIG. 3 is a front, sectional view of FIG. 1.

FIGS. 1-3 show an exemplary primary lighting unit 100A and a secondary lighting unit 100B that can be installed in a surface, for example a ceiling or a wall. The ceiling can be a drop ceiling. The lighting units 100A, 100B can be recessed or surface mounted. At least one of the lighting units 100A, 100B is electrically connected to a power source (not shown), such as a main power supply in a building. The lighting units 100A, 100B can be positioned to direct light to a specific area of a room, for example a patient bed.

Each of the lighting units 100A, 100B includes a lens 102A, 102B connected to a housing 104A, 104B having one or more upper walls 106A, 106B, one or more side walls 108A, 108B, and one or more end walls 110A, 110B at least partially defining an interior and an opening. The upper wall 106A, 106B and the side walls 108A, 108B each have a rectilinear configuration and are oriented at right angles to form a substantially elongated rectangular housing 104A, 104B. The top wall 106A, 106B and side walls 108A, 108B can be integrally formed and the end walls 110A, 110B can be separately connected. In other embodiments, other rectilinear and curvilinear configurations and orientations can be used and any number of integral or discrete pieces can be used to form the housings 104A, 104B.

The side walls 108A, 108B and end walls 110A, 110B can include one or more conduit openings 112A, 112B that act as a conduit for one or more electrical connectors to pass to or from the housings 104A, 104B. In some embodiments, the conduit openings 112A, 112B can be formed in plates 114A, 114B connected to the side walls 108A, 108B. The electrical connectors can be part of, or connected to, a power supply source such as main power wiring that runs through a building. In certain embodiments, the primary lighting unit 100A can be directly connected to the main power supply and the secondary lighting unit 100B can be indirectly connected to the main power supply though the primary lighting unit 100A. Certain configurations can utilize a flexible cable 111 to connect the primary lighting unit 100A to the secondary lighting unit 100B. The flexible cable 111 can be connected to a conduit opening 112A, 112B on each of the housing 104A, 104B.

In some configurations, one or more of the lighting units 100A, 100B can include one or more communication modules. The communication modules can include wireless and wired communication modules. In an certain embodiments, the communication module can include a port module 113 and a RF module 115. The port module 113 can include one or more jacks for a wired connection, for example wired CATS connection ports suitable for receiving an RJ45 connector. The illustrated configuration shows a dual port module that can have an in/out configuration for daisy-chaining connections between multiple light fixtures or other room components such as sensors or switches. The port module 113 can provide a digital bridge connection between an internal fixture bus and an external network. The RF module can provide wireless communication between the lighting units 100A, 100B, other light fixtures or room components and an external network.

FIG. 3 shows an exemplary internal layout of the lighting units 100A, 100B. A mounting tray 116A, 116B can be positioned in each housing 104A, 104B. One or more light emitter assemblies 118A, 118B are connected to the mounting tray 116A, 116B. One or more control components can also be positioned in the interior of the housing 104A, 104B. The housing 104A, 104B can include one or more mounting brackets 120A, 120B. One example of a control component is a driver 122 (two shown) that can be positioned in the housing 104A. The drivers are connected to a power supply and provides power to the light emitters 118A, 118B. The drivers in the primary housing 104A can be used to power the light emitters 118B in the secondary housing 104B. Other control components can include fuses, surge protectors, dimmers, and sensors. The control components can be connected in the housing 104A, 104B, using other mechanical connectors such as fasteners, or positioned in the housing 104A, 104B using brackets or other structural features. The light emitters 118A, 118B produce and emit light through an open portion of the housing 104A, 104B and through the lens 102A, 102B. The lens 102A, 102B can be plain and completely transparent, or it can include features that direct, diffuse, color, or otherwise alter the light leaving the housing 104A, 104B. Heat sinks 119A, 119B can extend from the mounting trays 116A, 116B opposite the light emitters 118A, 118B to dissipate heat.

Dimensions of the housing 104A, 104B may be chosen depending on the application, e.g., to accommodate the desired length or width of light distribution in a specific area. However, for example only, in one construction the elongated side walls 108 have a length of about 24 inches, or between about 12 to about 36 inches, or between about 18 and about 28 inches, etc.

In certain embodiments, apart from the control components, the lighting units 100A, 100B can be substantially identical. FIGS. 4-8 show an described a single lighting unit 100 that can be used as either the primary or secondary lighting unit 100A, 100B.

Figure 4:
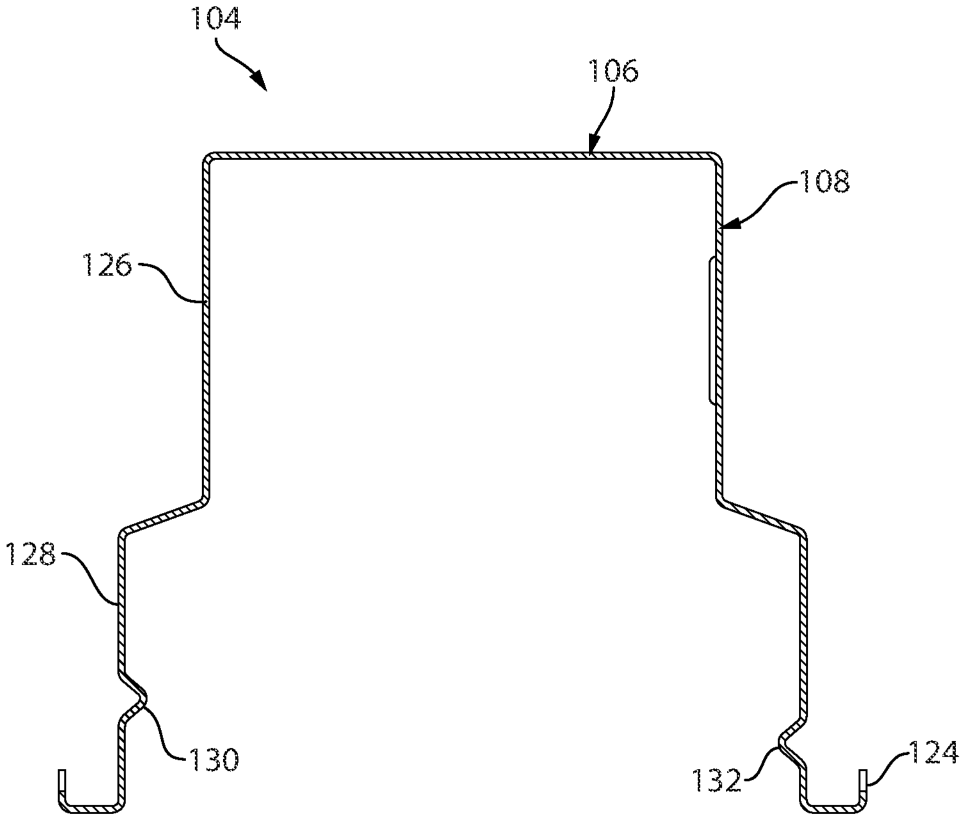
FIG. 4 is a front, sectional view of a light fixture housing.

As best shown in FIG. 4, one or more flanges 124 extend from the side walls 108 to position and/or support the housing 104, for example in a frame. A single continuous flange 124 can extend along each side of the housing 104 or multiple discrete flanges can be used extending from one or more of the side walls 108. The flanges 124 are shown as flush with a lower edge of the housing 104, but may also be offset to accommodate ceiling tiles in a drop ceiling. In alternative embodiments, the flange 124 is removed and the housing 104 is mounted in any other suitable manner. One or more brackets can also extend from and be connected to the housing 104 to position or secure the lighting unit 100.

In various exemplary embodiments, the housing 104 has an upper section 126 and a lower section 128 that is wider than the upper section 126. The upper section 126 can include one or more control components, such as drivers to power the light emitters. The lower section 128 includes a mounting feature for releasably connecting the lens 102 to the housing 104. In an exemplary embodiment, the mounting feature is a set of V-shaped protrusions 130, 132 that includes a first angled wall and a second angled wall extending from the side wall 108 into the interior of the housing 104. The first V-shaped protrusion 130 can be offset from the second V-shaped protrusion 132 so that a corresponding lens can be connected in a proper orientation. In the illustrated embodiment, the first V-shaped protrusion 130 is positioned vertically higher along the side wall 108 than the second V-shaped protrusion 132. This is useful to ensure that an A-symmetric lens is attached to the housing 104 in the correct orientation. Other types of offset mounting features can also be used.

Figure 5:
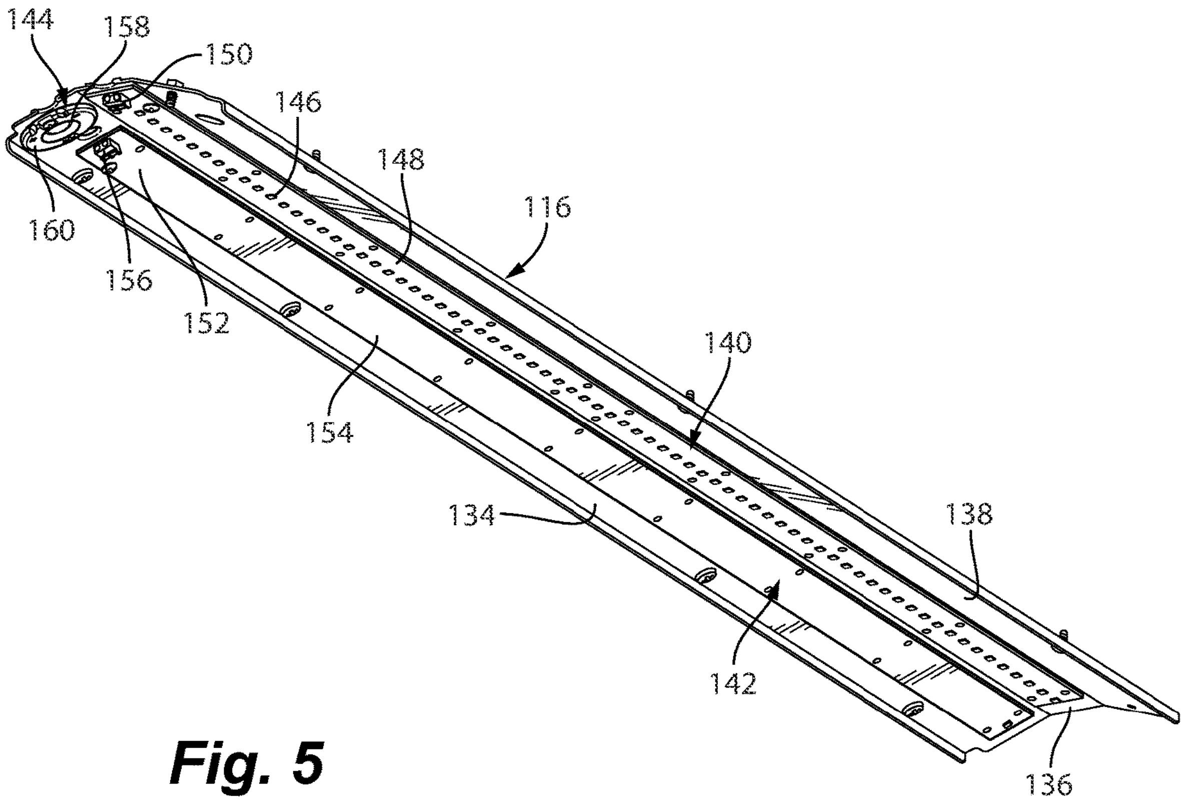
FIG. 5 is a bottom perspective view of a mounting bracket and light emitter assembly.
Figure 6:
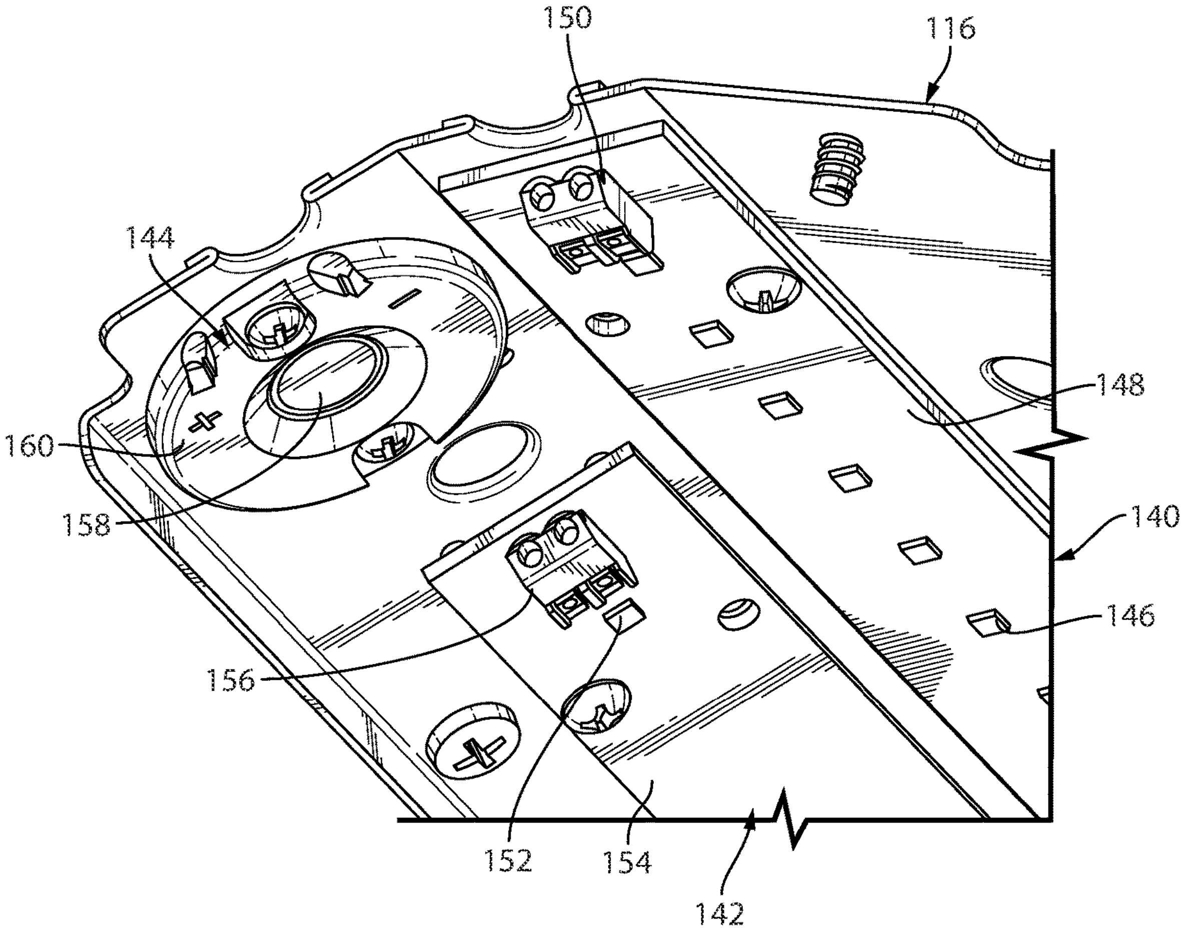
FIG. 6 is a partial, enlarged view of FIG. 5.

FIGS. 5 and 6 show an exemplary configuration of the mounting tray 116 and light emitter assemblies 118. The mounting tray 116 can be connected to the housing 104 by fasteners or other mechanical connections or through a joining process such as welding. The mounting tray 116 includes a first side portion 134, a central portion 136, and a second side portion 138. The side portions 134, 138 extend from the central portion 134 at an oblique angle toward the lens 102. In an exemplary embodiment, the mounting tray 116 extends substantially the entire length of the housing 104.

One or more light emitter assemblies are connected to the mounting tray 116. In certain aspects, a first light emitter 140, second light emitter 142, and a third light emitter 144 are connected to the mounting tray 116. The type and positioning of the light emitters 140, 142, 144 can be dependent of the desired light output. The light emitters 140, 142, 144 are connected to the mounting tray 116 through fasteners such as mounting screws or snap-fit connections.

In an exemplary embodiment, the first light emitter 140 is connected to the central portion 136 of the mounting tray 116. The first light emitter 140 is therefore oriented substantially perpendicular to the opening in the housing. The first light emitter 140 has an LED board that includes a plurality of LEDs 146 connected to a printed circuit board 148. The LEDs 146 can be arranged linearly, running along the length of the housing 104. A first connector 150 is provided on the PCB board to connect the light emitter to one or more control components. Other patterns and groupings of LEDs can be used, and other light sources may also be used. The first light emitter 140 can be configured to provide a first light output from the housing 104. In certain applications, this first light output can be used for ambient lighting.

In an exemplary embodiment, the second light emitter 142 is connected to the first side portion 134 of the mounting tray 116. The second light emitter 142 is therefore oriented at an oblique angle to the opening in the housing 104. The second light emitter 142 has an LED board that includes a plurality of LEDs 152 connected to a printed circuit board 154. The LEDs 152 can be arranged linearly, running along the length of the housing 104. A first connector 156 is provided on the PCB board to connect the light emitter to one or more control components. Other patterns and groupings of LEDs can be used, and other light sources may also be used. The second light emitter 142 can be configured to provide a second light output from the housing 104. The second light output can be different from the first light output in direction, intensity, color, or any combination thereof. In certain applications, this second light output can be used for examination lighting. In certain applications the second light output and first light output are used in combination for examination lighting.

In an exemplary embodiment, the third light emitter 144 is connected to the first side portion 134 of the mounting tray 116. The third light emitter 144 is therefore oriented at an oblique angle to the opening in the housing 104. The third light emitter 144 has one or more LEDs 158 connected to a printed circuit board (not shown) positioned in a circular housing 160. The LEDs 158 can be arranged in a circle to provide a spot-light type of output from the housing 104. The third light emitter 144 is connected to one or more control components. Other patterns and groupings of LEDs can be used, and other light sources may also be used. The third light emitter 144 can be configured to provide a third light output from the housing 104. The third light output can be different from the first and second light outputs in direction, intensity, color, or any combination thereof. In certain applications, the third light output can be used for reading lighting.

In an exemplary embodiment, the light emitters 140, 142, 144 are not optically isolated from one another. For example, the housing 104 and mounting tray 116 are configured so that the light emitters 140, 142, 144 direct light to a common area in the housing.

Figure 7:
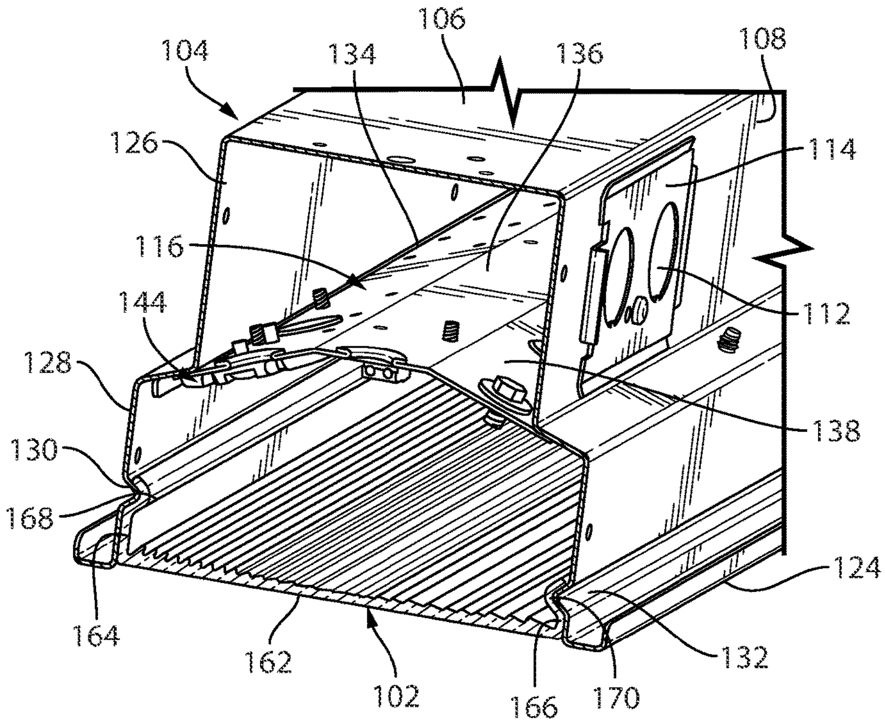
FIG. 7 is a front perspective view of the housing and a lens.
Figure 8:
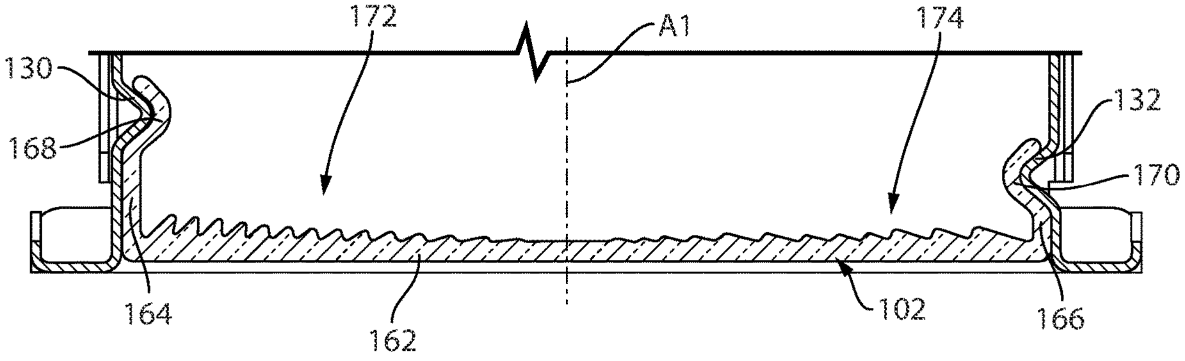
FIG. 8 is a partial, front view of the lens and housing of FIG. 7.

FIGS. 7-8 show the lens 102 connected to the housing 104. The lens 102 includes a bottom portion 162 having a first arm 164 and a second arm 166 extending therefrom. The first and second arms 164, 164 each include a hook 168, 170 at least partially defining an outwardly facing groove. The V-shaped protrusions 130, 132 of the housing 10 fit into a corresponding groove on the lens 102. The hooks 168, 170 can be offset from one another to match the offset protrusions 130, 132. The mounting feature allows the lens 102 to be easily changed to accommodate different lenses with different light distributions.

In some exemplary embodiments, the mounting feature connects the lens 102 to the housing 104 without any other attachment such as screws, bolts, clips, snap-connectors etc. The lens 102 can therefore be field mounted and field changed by hand without the use of any special tools or dedicated tools. For example, while a tool such as a knife or screwdriver may be used to remove the lens 102, a specific tool is not needed to remove any screws or other fasteners. Positioning the control components in the upper section 126 also allows the lens to be changed without exposure to a high voltage connection of component, such as a high voltage connection between a driver and the power supply.

In certain aspects, the lens 102 is configured to provide an asymmetric light output. The bottom portion 162 of the lens 102 includes a plurality of optical features. In the illustrated embodiment, the optical features include a plurality of prisms that extend from the bottom portion 162 toward the interior of the housing 104. The lens 102 can have a central axis A1, a first set of prisms 172 can be positioned on a first side of the central axis A1 and a second set of prisms 174 can be positioned on a second side of the central axis A1.

The first set of prisms 172 can each include a front face facing the central axis A1 and a back face facing away from the central axis A1. The front and back faces extend at an oblique angle toward the central axis A1 to give the first set of prisms 172 a substantially sawtooth pattern. The angle of the prisms 172 relative to the central axis A1 can increase as the distance from the central axis A1 increases so that the outer prisms are angled more toward parallel with the central axis A1 than the inner prisms.

The second set of prisms 174 can each include a front face facing the central axis A1 and a back face facing away from the central axis A1. The front and back faces extend at an oblique angle toward the central axis A1 to give the first set of prisms 174 a substantially sawtooth pattern. The angle of the prisms 174 relative to the central axis A1 can increase as the distance from the central axis A1 increases so that the outer prisms are angled more toward parallel with the central axis A1 than the inner prisms.

Figure 9:
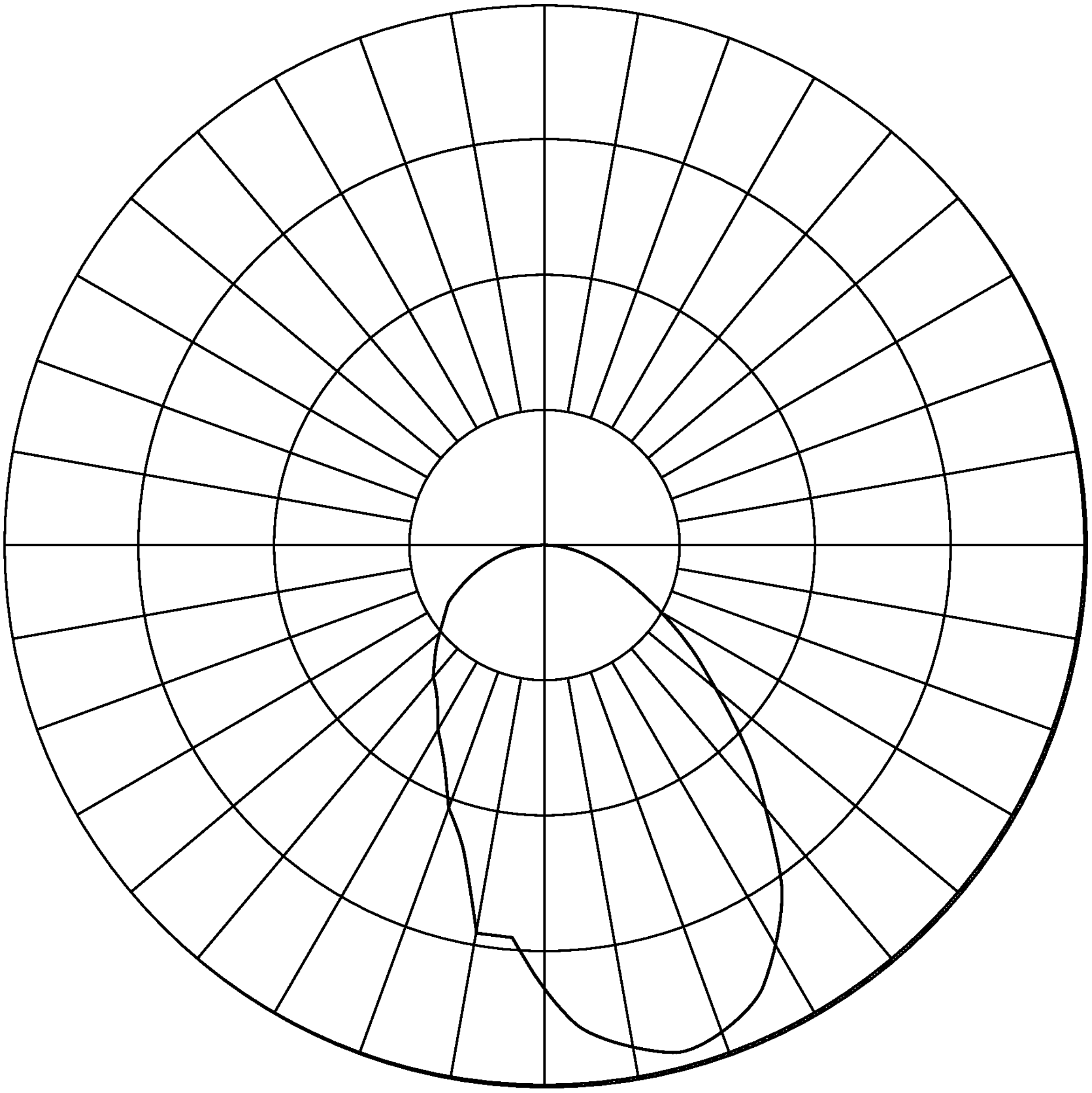
FIG. 9 is a candela plot for an exemplary light output of one of the lighting units.

At least some of the first set of prisms 172 can have a greater angle relative to the central axis A1 than the second set of prisms 174. For example, the outer prisms of the first set of prisms 172 can have a greater angle than the outer prisms of the second set of prisms 174. This helps to bend the light emitted from the light emitters 140, 142, 144 in an asymmetric direction output toward the side of the second set of prisms 174. FIG. 9 shows an exemplary candela plot for the light output of one of the lighting units 102 operating with the first and second light emitters 140, 142 activated. The light output of the other lighting unit can be a mirror image thereof.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms “front,” “rear,” “upper,” “lower,” “upwardly,” “downwardly,” and other orientational descriptors are intended to facilitate the description of the exemplary embodiments of the present invention, and are not intended to limit the structure of the exemplary embodiments of the present invention to any particular position or orientation. Terms of degree, such as “substantially” or “approximately” are understood by those of ordinary skill to refer to reasonable ranges outside of the given value, for example, general tolerances associated with manufacturing, assembly, and use of the described embodiments.

What is claimed:

1. A light fixture comprising:

a housing having an upper wall, a first side wall, and a second side wall at least partially defining an interior and a bottom opening;

a mounting tray positioned in the interior and releasably connected to the housing;

a first light emitter connected to the mounting tray and having a first light output;

a second light emitter connected to the mounting tray and having a second light output, wherein the second light emitter is oriented at an oblique angle to the bottom opening;

a third light emitter connected to the mounting tray and having a third light output; and a lens connected to the housing, wherein the lens includes a first set of prisms and a second set of prisms;

wherein the first light emitter, the second light emitter and the third light emitter are independently controlled.

2. The light fixture of claim 1, wherein the first set of prisms has a series of varying angles relative to a central axis of the lens.

3. The light fixture of claim 1, wherein the lens is releasably connected to the housing without any additional fasteners.

4. The light fixture of claim 1, wherein the third light emitter includes a spot light output.

5. The light fixture of claim 1, wherein the first light emitter, second light emitter, and third light emitter are positioned in the same compartment.

6. The light fixture of claim 1, further comprising a secondary housing defining a secondary interior, a secondary light emitter positioned in the secondary interior, a secondary lens connected to the secondary housing, and a driver positioned in the primary housing and providing power to at least one of the first, second, and third light emitters and providing power to the secondary light emitter.

7. A light fixture comprising:

a housing having an upper wall, a first side wall, and a second side wall at least partially defining an interior and a bottom opening;

a mounting tray positioned in the interior and releasably connected to the housing;

a first light emitter connected to the mounting tray and having a first light output;

a second light emitter connected to the mounting tray and having a second light output, wherein the second light emitter is oriented at an oblique angle to the bottom opening;

a third light emitter connected to the mounting tray and having a third light output; and a lens connected to the housing, wherein the first side wall and the second side wall each include a first mounting feature having a projection extending into the interior, wherein the lens has a base, a first arm extending from the base, and a second arm extending from the base and wherein the first light emitter, the second light emitter, and the third light emitter are positioned in the same compartment.

8. The light fixture of claim 7, wherein the first light emitter, second light emitter, and third light emitter are independently controlled.

9. A light fixture comprising:

a housing having an upper wall, a first side wall, and a second side wall at least partially defining an interior and a bottom opening;

a mounting tray positioned in the interior and releasably connected to the housing;

a first light emitter connected to the mounting tray and having a first light output;

a second light emitter connected to the mounting tray and having a second light output, wherein the second light emitter is oriented at an oblique angle to the bottom opening;

a third light emitter connected to the mounting tray and having a third light output; and a lens detachably connected to the housing via at least a first flange, the at least first flange extending from a lower edge of the first side wall and the second side wall.

10. A light fixture comprising:

a primary housing having an upper wall, a first side wall, and a second side wall at least partially defining a primary interior and a bottom opening;

a mounting tray positioned in the primary interior and releasably connected to the primary housing;

a first light emitter connected to the mounting tray and having a first light output;

a second light emitter connected to the mounting tray and having a second light output;

a third light emitter connected to the mounting tray and having a third light output;

a primary lens connected to the primary housing;

a secondary housing defining a secondary interior;

a secondary light emitter positioned in the secondary interior;

a secondary lens connected to the secondary housing; and a driver positioned in the primary housing and providing power to at least one of the first, second, and third light emitters and providing power to the secondary light emitter.

11. The light fixture of claim 10, wherein the driver is connected to the secondary light emitter through a conductor positioned in a flexible conduit extending between a first conduit opening on the housing and a second conduit opening on the secondary housing.

12. The light fixture of claim 10, further comprising a communication module operably connected to the driver.

13. The light fixture of claim 12, wherein the communication module includes a wired communication module for connecting the driver to a network.

14. The light fixture of claim 12, wherein the communication module includes a wireless communication module for connecting the driver to a network.

15. The light fixture 11, wherein the primary lens provides an asymmetric light output toward the secondary housing and the secondary lens provides an asymmetric light output toward the primary housing.

16. A method of providing multiple light outputs comprising:

positioning a primary lighting unit over an area, the primary lighting unit having a primary housing, a plurality of primary light emitters positioned in the primary housing, and a primary lens connected to the primary housing;

positioning a secondary lighting unit apart from and near the primary lighting unit over the area, the secondary lighting unit having a secondary housing, a plurality of secondary light emitters positioned in the secondary housing, and a secondary lens connected to the secondary housing;

connecting a one or more drivers to a power supply, wherein the one or more drivers are connected to provide power to the primary light emitters and secondary light emitters; and connecting the one or more drivers to a network, wherein the network provides a bridge between the one or more drivers and the user to control a light output of the primary light emitters and secondary light emitters.

17. The method of claim 16, wherein the one or more drivers are positioned in the primary housing.

18. The method of claim 16 wherein the one or more drivers are connected to a network through a wireless communication module or a wired communication module.

* * * * *